Patented Dec. 5, 1922.

1,437,401

UNITED STATES PATENT OFFICE.

HAROLD S. DAVIS AND SAUL D. SEMENOW, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

PURIFICATION OF PHENOL-CONTAINING LIQUORS.

Application filed June 23, 1919. Serial No. 306,254.

*To all whom it may concern:*

Be it known that we, HAROLD S. DAVIS, a subject of the British Empire, residing at Pittsburgh, in the county of Allegheny and State of Pennsylvania, and SAUL D. SEMENOW, a citizen of the United States, residing at Pittsburgh, in the county of Allegheny and State of Pennsylvania, have invented a new and useful Improvement in the Purification of Phenol-Containing Liquors, of which the following is a full, clear, and exact description.

The present invention relates to the purification of phenol-containing liquors, i. e., liquors containing phenol or phenoloid bodies, which are ordinarily termed "phenols."

The invention relates particularly to a process of purifying such liquors with a phenol-absorbing material preferably a humus material, which is revivified and then reused for treating more liquor.

Certain waste liquors, such as the waste liquor from the ammonia stills of coke and gas plants, contain phenols. Even minute quantities of these phenols render water unfit for domestic uses. The presence of the phenols in the waste liquors renders them a great nuisance and prohibits their discharge into streams or lakes, the water from which may be used for drinking purposes. Moreover they are poisonous to fish life, and render the discharge of such waste liquors into the streams the subject of complaint and legal regulation. The phenols defy removal from the water by ordinary methods of sewage purification. It has been found, however, that if the phenol-containing waste liquors are treated with a suitable phenol-absorbing material, such for example as peat or ground lignite, the phenols, or a sufficient percentage of them, may be removed so that the water may be discharged into streams.

A particularly effective process of removing the phenols we have found to consist in the filtration of the phenol-containing waste liquors with ground lignite. However, after the filter bed of lignite has been used, it apparently absorbs a sufficient amount of the phenols to be relatively inactive, necessitating filtration through a fresh filter bed of lignite. We have found that the lignite need not be discarded but may be reused, if revivified to destroy the absorbed phenols. We have found that the lignite will become revivified upon standing for a sufficient length of time and under suitable conditions. Apparently for the most effective revivification of the lignite, the lignite should stand for several hours or some days under such conditions as will permit the development and growth in the body of lignite of certain phenol-destroying micro-organisms.

In purifying the phenol-containing liquors and revivifying the phenol-absorbing material the best procedure now known to us is as follows:—We have used this process particularly for the purification of the phenol-containing waste liquor from ammonia stills. The ammonia still waste is first preferably allowed to stand to settle out the solid substances and then given a preliminary filtration through some iron oxide containing inorganic material, such for example as the spent blast furnace slag which results from the treatment of the mine water by the process of the Heckman Patent No. 1,171,046 of February 8th, 1916. This preliminary filtration is for the removal of the remaining solids, the tarry matter and the sulphides which exist in such liquor, principally as calcium sulphide. The ammonia still waste may, if desired, be then given a further preliminary treatment for the removal of cyanogen compounds.

The liquor after this preliminary treatment still contains phenols. To remove the phenols the liquor is allowed to slowly percolate through a filter bed of finely ground humus material. We have found that ground lignite is a suitable material, although we have found that other humus materials, such as peat, may be used. If desired, some porous material, such as coke, may be mixed with the peat or other humus material to keep it from packing in the filter bed. We have found that a filter bed of lignite, about a foot or more in thickness, is satisfactory. The filter bed of ground lignite is used until it absorbs sufficient phenol to reduce its filtering effectiveness below the desired point. Then the ground lignite is disconnected from the filtration system and allowed to stand for several hours or even several days depending on the amount of phenol absorbed. The ground lignite is allowed to remain damp, and if necessary, moisture is added to maintain its damp condition. The air is allowed free access to the material to supply oxygen thereto. We have found that the best results are obtained if the ground lignite is allowed to stand in the dark, although revivification may take place in the light. The lignite is maintained during its revivification at about room temperature; that is to say about 20 to 25° C. We have found that humus material standing in a bed about a foot thick under such conditions had revivified itself in about a week's time.

The revivification of the ground lignite is apparently due to certain phenol-destroying micro-organisms.

While the phenol-destroying micro-organisms will apparently develop of themselves in the ground lignite which has absorbed the phenols in the filter bed, we prefer to hasten their development by the inoculation of a fresh batch of material to be revivified, by some of the material which is undergoing revivification or some other material rich in bacterial life such, for example, as activated sludge from sewage. After the phenol content of the ground lignite has been sufficiently reduced by the above treatment, it is put back into the filter bed for the further treatment of fresh supplies of phenol-containing liquors.

When peat is employed as the filtering material, it is used and revivified the same as the lignite. Peat is a particularly satisfactory material as it revivifies comparatively quickly and retains its filtering power after being used and reused over a long period of time.

The present process effects a considerable economy in that the humus material may be used over and over. Moreover, the humus material which has been revivified by the action of the phenol-destroying micro-organisms is apparently fully as effective, if not more effective, than fresh material.

The effectiveness of the thus treated humus material for further filtration of phenol contaminated liquors, is apparently due to the phenol destroying microorganisms which have developed in the humus material and which are therefore ready to destroy the phenoloid bodies in the fresh supplies of phenol contaminated liquor.

While the revivification of the filter bed material has been specifically described as an intermittent process in which the filtration is suspended during the revivification of the filter material, the process might be otherwise carried out. For example, instead of having the process intermittent, it might be made continuous by maintaining the filtration conditions such that the phenol-destroying micro-organisms would develop during the filtration, so that the filter bed would be continuously revivified during use.

While we have specifically described our process in the form now best known to us, it is to be understood that the invention is not limited to all of the specific details of our preferred method of procedure, but may be embodied in processes in which the mode of procedure may be varied within the scope of the following claims.

We claim:

1. The process of purifying phenol-containing liquors, which consists in treating the liquor with a phenol-absorbing humus material, then allowing the humus material to become revivified by standing, and re-using the revivified humus material for the purification of a fresh supply of liquor, substantially as described.

2. The process of purifying phenol-containing liquors, which consists in treating the liquor with a phenol-absorbing humus material, allowing the humus material to become revivified by standing subjected to the action of phenol-destroying micro-organisms and reusing the revivified humus material for the purification of a fresh supply of liquor, substantially as described.

3. The process of purifying phenol-containing liquors, which consists in treating the liquor with a phenol-absorbing humus material, allowing the humus material to become revivified by standing in a moist condition, and reusing the revivified humus material for the purification of a fresh supply of liquor, substantially as described.

4. That step in the herein described process which consists in developing phenol-destroying micro-organisms in the phenol-absorbing humus material, substantially as described.

5. The process of purifying phenol-contaminated liquors which consists in passing the liquor through a filter bed containing humus material in which phenol-destroying micro-organisms have been developed, substantially as described.

6. Those steps in the herein described process, which consists in developing cultures of phenol-destroying micro-organisms in a humus filtering material, and thereafter filtering a phenol-containing liquor through such material, substantially as described.

7. That step in the herein described process which consists in subjecting a phenol-absorbing material which has absorbed phenol to the action of phenol-destroying micro-organisms in a moist condition at a temperature between 15 and 35° C., substantially as described.

8. Those steps in the herein described process which consists in subjecting a phenol-absorbing material which has absorbed phenol to the action of phenol-destroying micro-organisms in a moist condition and using the thus revivified material for the absorption of more phenol, substantially as described.

9. That step in the herein described process of revivifying a phenol-absorbing humus material which consists in developing phenol-destroying micro-organisms in the humus material and maintaining the humus material under conditions favorable to the development of such micro-organic life, substantially as described.

10. That step in the herein described process, which consists in revivifying a material which has absorbed phenols by inoculating the material with phenol destroying micro-organisms, substantially as described.

11. That step in the herein described process, which consists in revivifying a material which has absorbed phenols by inoculating the material with phenol destroying micro-organisms, and maintaining the material under conditions favorable to the growth of such micro-organisms, substantially as described.

12. That step in the herein described process, which consists in revivifying peat which has absorbed phenols by inoculating the peat with phenol destroying micro-organisms and allowing it to stand under conditions favorable to the growth of such micro-organisms, substantially as described.

13. The process of purifying phenol-containing liquors which consists in treating the liquor with peat, then allowing the peat to become revivified by standing subjected to the action of phenol destroying micro-organisms, and reusing the revivified peat for the purification of a fresh supply of liquor, substantially as described.

14. That step in the herein described process of revivifying peat which has absorbed phenols, which consists in developing phenol-destroying micro-organisms in the peat, substantially as described.

15. The process of purifying phenol contaminated liquors which consists in passing the liquor through a filter bed of humus material and destroying the phenoloid bodies by the action of phenol-destroying micro-organisms developed and harbored in the humus material of the filter bed, substantially as described.

In testimony whereof, we have hereunto set our hands.

HAROLD S. DAVIS.
SAUL D. SEMENOW.